United States Patent
Basak et al.

(10) Patent No.: US 7,711,371 B2
(45) Date of Patent: May 4, 2010

(54) METHOD AND SYSTEM FOR ANALYSIS AND VISUALIZATION OF A WIRELESS COMMUNICATIONS NETWORK

(75) Inventors: Joydeep K. Basak, Austin, TX (US); Veeraraghavan A. Anatha, Austin, TX (US); Eric S. Reifsnider, Corvallis, OR (US); Roger R. Skidmore, Austin, TX (US); Gemel M. Yang, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 300 days.

(21) Appl. No.: 11/426,921

(22) Filed: Jun. 27, 2006

(65) Prior Publication Data

US 2007/0298805 A1    Dec. 27, 2007

(51) Int. Cl.
*H04W 40/00* (2009.01)
(52) U.S. Cl. ...................... 455/446; 702/182
(58) Field of Classification Search ............... 455/33.1, 455/33.4, 56.1, 441, 446, 448; 702/5, 20, 702/2
See application file for complete search history.

(56) References Cited

U.S. PATENT DOCUMENTS

| | | |
|---|---|---|
| 4,817,012 A | 3/1989 | Cali |
| 4,885,694 A | 12/1989 | Pray |
| 5,111,392 A | 5/1992 | Malin |
| 5,119,307 A | 6/1992 | Blaha |
| 5,239,487 A | 8/1993 | Horejsi |
| 5,293,640 A | 3/1994 | Gunmar |
| 5,307,261 A | 4/1994 | Maki |
| 5,339,184 A | 8/1994 | Tang |
| 5,375,123 A | 12/1994 | Andersson |
| 5,394,522 A | 2/1995 | Sanchez-Frank |
| 5,465,390 A | 11/1995 | Cohen |
| 5,467,441 A | 11/1995 | Stone |
| 5,485,568 A | 1/1996 | Venable |
| 5,491,644 A | 2/1996 | Pickering |
| 5,528,518 A | 6/1996 | Bradshaw |
| 5,555,354 A | 9/1996 | Strasnick |
| 5,561,841 A | 10/1996 | Markus |
| 5,625,827 A | 4/1997 | Krause |
| 5,689,355 A | 11/1997 | Okubo |
| 5,710,758 A | 1/1998 | Soliman |

(Continued)

OTHER PUBLICATIONS

T.S. Rappaport, et al., "Use of Topographic Maps With Building Informatin to Determine Antenna Placements and GP Satellite Coverage for Radio Detection and Tracking in Urban Environments", MPRG Technical Report MPRG-TR-95-14, Virginia Tech, Sep. 1995.

(Continued)

*Primary Examiner*—Tu X Nguyen

(57) ABSTRACT

A system and method for analysis of a wireless communications network is disclosed. A map of a physical environment integrating communications hardware for implementing a wireless communications network is defined. Client service requirements and regions for the wireless communications network are defined. Mesh point constraints and mesh linkage constraints for the wireless communications network are defined. The communications hardware is placed on the map at initial locations. Whether at least one of the defined mesh point constraints and mesh linkage constraints have been met by at least one mesh link between communications hardware based upon the initial locations of the communications hardware in the communications network is calculated. In one embodiment, the at least one calculation is displayed as a visualization on the defined map.

20 Claims, 3 Drawing Sheets

U.S. PATENT DOCUMENTS

| | | | |
|---|---|---|---|
| 5,755,072 | A | 5/1998 | Lingafelter |
| 5,761,093 | A | 6/1998 | Urbish |
| 5,794,128 | A | 8/1998 | Brocket |
| 5,828,960 | A | 10/1998 | Tang |
| 5,831,610 | A | 11/1998 | Tonelli |
| 5,845,124 | A | 12/1998 | Berman |
| 5,877,777 | A | 3/1999 | Colwell |
| 5,907,850 | A | 5/1999 | Krause |
| 5,926,762 | A | 7/1999 | Arpee |
| 5,940,196 | A | 8/1999 | Pichler |
| 5,945,976 | A | 8/1999 | Iwamura |
| 5,949,988 | A | 9/1999 | Feisullin |
| 5,953,669 | A | 9/1999 | Stratis |
| 5,963,867 | A | 10/1999 | Reynolds |
| 5,977,851 | A | 11/1999 | Stancil |
| 5,987,328 | A | 11/1999 | Ephremides |
| 5,994,984 | A | 11/1999 | Stancil |
| 6,032,105 | A | 2/2000 | Lee |
| 6,038,547 | A | 3/2000 | Casto |
| 6,044,273 | A | 3/2000 | Tekinay |
| 6,058,262 | A | 5/2000 | Kawas |
| 6,075,541 | A | 6/2000 | Maclinovsky |
| 6,088,522 | A | 7/2000 | Lee |
| 6,111,857 | A | 8/2000 | Soliman |
| 6,229,540 | B1 | 5/2001 | Tonelli |
| 6,285,377 | B1 | 9/2001 | Greenbaum |
| 6,330,005 | B1 | 12/2001 | Tonelli |
| 6,337,688 | B1 | 1/2002 | Berstis |
| 6,338,031 | B1 | 1/2002 | Lee |
| 6,341,222 | B1 * | 1/2002 | Neumiller et al. ........ 455/422.1 |
| 6,356,758 | B1 | 3/2002 | Almeida |
| 6,470,195 | B1 | 10/2002 | Meyer |
| 6,487,417 | B1 | 11/2002 | Rossoni |
| 6,496,290 | B1 | 12/2002 | Lee |
| 6,681,140 | B1 | 1/2004 | Heil |
| 7,299,168 | B2 * | 11/2007 | Rappaport et al. ............ 703/20 |
| 2001/0051503 | A1 | 12/2001 | Lush |
| 2002/0023244 | A1 | 2/2002 | Hatanaka |
| 2002/0075825 | A1 | 6/2002 | Hills |
| 2002/0177982 | A1 | 11/2002 | Boulouednine |
| 2003/0023411 | A1 | 1/2003 | Witmer |
| 2006/0235605 | A1 * | 10/2006 | Flynt .......................... 701/200 |

OTHER PUBLICATIONS

R.K. Morro, Jr. and T.S. Rappaport, "Getting in", Wireless Review Magazine, Mar. 2000.

R. Skidmore, et al., Russell Senate Office Building Propagation Study, Project Report for Joseph R. Loring & Associates: "Assessment and Study of the Proposed Enhancements of the Wireless Communications Environment of the Russell Senate Office Building (RSOB) and Associated Utility Tunnels", AOC Conract #ACBR96088, Prepared for Office of the Architect of the Capital, Feb. 20, 1997.

Wireless Valley Communications, Inc., "Siteplanner 3-16 for Windows 95/98/NT User's Manual", pp. 5-178 to 5-156, 1999.

M. Panjawani, et al., "Interactive Computation of Coverage Regions for Wireless Communication in Multifloored Indoor Environments", IEEE Journal on Selected Areas in Communications, vol. 4, No. 3, Apr. 1996.

T.S. Rappaport, et al., "Wireless Communications: Past Events and a Future Perspective", IEEE Communications Magazine, May 2002.

T.S. Rappaport, et al., "Radio Propagation Prediction Techniques and Computer-Aided Channeling Modeling for Embedded Wireless Microsystems,"ARPA Annual Report, MPRG Technical Report MPRG-TR-94-12, Virginia Tech, Jul. 1994.

T.S. Rappaport, et al, "Use of Topographic Maps With Building Information to Determine Antenna Placements for Radio Detection and Tracking in Urban Environments", MPRG Technical Report MPRG-TR-95-19, Virginia Tech, Nov. 1995.

D. Ullmo, et al. "Wireless Propagation in Buildings: A Statistical Scattering Approach", IEEE Transactions on Technology, vol. 48, No. 3, May 1999.

T.S. Rappaport, "Wireless Communications: Principles and Practice" Second Edition, Prentice Hall, 2002.

T.S. Rappaport, "Isolating Interference", Wireless Review Magazine, May 2000.

T.S. Rappaport and R. Skidmore, Slides From "Introduction to In-Building Wireless Systems", Infocast In-Building Wireless Solutions Conference and Exposition, Feb. 4, 2003.

S. Sandhu, M.P. Koushik and T.S. Rappaport, "Predicted Path Loss for Roslyn, VA, First Set of Predictions for ORD Project on Site Specific Propagation Prediction", MPRG Technical Report MPRG-TR-94-20, Virginia Tech, Dec. 1994.

S. Sandhu, M.P. Koushik and T.S. Rappaport, "Predicted Path Loss for Roslyn, VA, First Set of Predictions for ORD Project on Site Specific Propagation Prediction", MPRG Technical Report MPRG-TR-95-03, Virginia Tech, Mar. 1995.

S. Seidel, et al. "Site-Specific Propagation Prediction for Wireless In-Building Personal Communication Design", IEEE Transaction on Vehicular Technology, vol. 43, No. 4, Nov. 1994.

S. Shakkottal and T.S. Rappaport, "Research Challenges in Wireless Networks: A Technical Overview", Proceeding of Fifth International Symposium on Wireless Personal Multimedia Communications, Honolulu, HI, Oct. 2002.

H. Sherali, et al., "On the Optimal Location of Transmitters for Micro-Cellular Radio Communication System Design", IEEE Journal on Selected Areas in Communications, vol. 14, No. 3, pp. 662-673, May 1996.

R. Sidmore, et al., "A Comprehensive In-Building and Microcellular Wireless Communication System Design Tool", The Bradley Department of Electrical Engineering, MPRG-TR-97-13, Jun. 1997, Master's Thesis—Unpublished by Virginia Tech for 2 Years After Submission.

R. Skidmore, et al., Russell Senate Office Building Propagation Study, Project Report for Joseph R. Loring & Associates: "Project Update", ANC Contract #ACBR96088, Prepared for Office of the Architect of the Capital, Jan. 19, 1997.

R. Torres, et al. "Cindoor: An Engineering Tool for Planning and Design of Wireless Systems in Enclosed Spaces", IEEE Antennas and Propagation Magazine, vol. 41, No. 4, Aug. 1999.

R. Skidmore, et al., Interactive Coverage Region and System Design Simulation for Wireless Communication Systems in Multi-Floored Indoor Environments: SMT Plus im, IEEE ICUPC Proceedings, 1996.

Skidmore, et al., "Towards Integrated PSEs for Wireless Communicatiions: Experiences With the S4W and Siteplanner Projects", Mobile Computing and Communications Review, vol. 1, No. 2.

T.S. Rappaport, et al., "Radio Propagation Prediction Techniques and Computer-Aided Channel Modeling for Embedded Wireless Microsystems", MPRG Tech. Report MPRG-TR-95-08, Virginia Tech, Jul. 95.

Jeremy K. Chen and T.S. Rappaport, "Cool Cloud Wireless Lan Design Guidelines and User Traffic Modeling for In-Store Use (Part 1: System Deployment)" Technical Report, Project Sponsor: Schlotzsky's, Inc. UTA 3-390, WNCG-TR-2003, 11-01, Nov. 2003.

Jeremy K. Chen and T.S. Rappaport, "Cool Cloud Wireless Lan Design Guidelines and User Traffic Modeling for In-Store Use (Part 1: System Deployment)" Technical Report, Project Sponsor: Schlotzsky's, Inc. UTA 3-390, WNCG-TR-2003, 11-01, Nov.r 2003.

Chen Na and T.S. Rappaport, "Cool Cloud Wireless Lan Design Guidelines and User Traffic Modeling for In-Store Use (Part 2: Traffic Statistics)" Technical Report, Project Sponsor: Schlotzsky's, Inc. UTA 3-390, WNCG-TR-2003, 11-01, Nov. 2003.

Company Web Page "Agilent" www.agilent.com, Product Name: Wizard.

Company Web Page "Comarco" www.edx.com, Product Name: SignalPro.

Company Web Page "Comopt" www.comopt.com, Product Name: CellOpt.

Company Web Page "Lucent" www.bell-labs.com, Product Name: WiSE.

Company Web Page "Ericsson" www.ericsson.com, Product Name: TEMS Lite.
Company Web Page "Ericsson" www.ericsson.com, Product Name: TEMS.
Company Web Page "Marconi" www.marconi.com, Product Name: PlaNET.
Company Web Page "Marconi" www.marconi.com, Product Name: decibelPlanner.
J. He, A. Vertak, L.T. Watson, C.A. Stinson, N. Ramakrishnan, C.A. Shaffer, T.S. Rappaport, C.R. Anderson, K. Bae, J. Jiang, and W.H. Tranter, Article Submited to IEEE Transactions on Wireless Communications Aug. 2002 Titled "Globally Optimal Transmitter Placement for Indoor Wireless Communication System".
Software by Andrew, Titled "RF Planner" Dated Jun. 17, 1997.
A User Guide Titled "Andrew Microwave System Planner" Dated Jul. 1999.
A User Guide Titled "Andrew Antenna System Planner" Dated Jun. 1999.
Article "Building Database Manipulator", Copyright, Jan. 1998, MPRG and Virginia Tech.
T. Rappaport, PCS 97 Track 7; Engineering & Systems Management. Propagator; vol. 8, No. 3; Fall.
R. Skidmore & T. Rappaport; SMT Plus 1.0 User's Manual; Copyright, Aug. 1996, Virginia Tech.
Intel Technology Journal, vol. 7, Issue 3, Aug. 2003.
It Wireless Web Article, Nov. 2003.
P. Tournois, et al. "Pick Your Wireless Solution", Web Article, McCombs School of Business, University of Texas At Austin.
Article From Visionael Website.
Article From the Chantry Networks Information Website.
Article From the Aruba Networks Information Website.
Article From the Meru Networks Information Website.
Article From the Legra Networks Information Website.
Article From the Trapez Networks Information Website.
Brian Jenkins, "Airflow Technology-Solving the WLAN Dilemma", Airflow Networks Information Website, Jul. 2003.
Dr. Harry Bims, "Securing Enterprise WLANS", Aug. 2003.
Dr. Harry Bims, "Enabling Voice-Over WLANS", Sep. 2003.
Brian Jenkins, "High Availability for Mission-Critical WLANS", Sep. 2003, Airflow Applications Guide.
Articles From the Airespace Networks Information Website.
R.K. Morrow, Jr., "Site-Specific Indoor Planning", Applied Microwave and Wireless Magazine, Mar. 1999.
T.S. Rappaport, et al. "Wireless Communications: Past Events and a Future Perspective", IEEE Communications Magazine, Jun. 2002.
S. Shakkottai, T.S. Rappaport, "Research Challenges in Wireless Networks: A Technical Overview", 5th International Symposium on Wireless Personal Multimedia Communications, Honolulu, HI, Oct. 2002.
R.K. Morrow, T.S. Rappaport, "Getting In", Wireless Review Magaine, Mar. 2000.
Rajkumar, "Predicting RF Coverage in Large Environments Using Ray-Beam Tracing and Partitioning Tree Represented Geometry", Wireless Networks, vol. 2, 1996.
T.S. Rappaport, M. Koushik, M. Ahmed, C. Carter, B. Newhall, and N. Zhang, "Use of Topographic Maps With Building Information to Determine Antenna Placements and GPS Satellite Coverage for Radio Detection and Tracking in Urban Environments", MPRG Technical Report MPRG-TR-95-14, Virginia Tech, Sep. 1995.
PCT/US07/68011—International Search Report and Written Opinion mailed Sep. 2, 2009.
PCT/US07/68011—International Preliminary Report on Patentability issued Jan. 6, 2009.

* cited by examiner

METHOD AND SYSTEM FOR ANALYSIS AND VISUALIZATION OF A WIRELESS COMMUNICATIONS NETWORK

FIELD OF THE INVENTION

The present invention relates generally to wireless communications systems and more specifically to analyzing and visualizing wireless mesh networks.

BACKGROUND

A Wireless Mesh Network is a collection of mesh nodes (that may include access points, client devices, and fixed or mobile transceivers, all of which will be referred to herein as APs) that are interconnected by wired or wireless links (mesh links) to form a web-like "mesh" communications network. A number of select APs that form the mesh also serve as Backhaul Anchored Nodes (BANs) that connect the mesh network through wired or wireless backhaul connections to the Internet. Data is communicated through the network from node to node, in "hops", as it makes its way from a client of one mesh node to one or more clients of another mesh node in the network, or from such a client out to the Internet, or from the Internet back to one or more mesh node clients.

Multiple mesh hops, and therefore the services of many mesh nodes, are often required in order for data to reach a particular client. As a result, the overall performance of the network depends not only on the placement of each individual mesh node, but also on the placement of mesh nodes relative to each other and with respect to the environment. The interdependence of each mesh link and the overall performance of the network leads to a multitude of possible failure points. In addition, the designer must not neglect coverage of each individual AP to its respective clients. Wireless meshes are high bandwidth networks that are characterized by high traffic loads and high capacity. Wireless mesh networks service applications with stringent delay/jitter constraints, but which are typically distributed over geographical areas. Further complications arise from the fact that mesh network clients naturally exercise the network in varying scales of throughput with varying requirements for Quality of Service (QoS). In short, wireless mesh networks present all of the practical challenges of wired networks, and of non-mesh wireless networks, along with additional complications due to multiple-hop routing of data, and due to the typical physical scale of mesh network deployments. Consequently, a sophisticated design is critical for wireless mesh network performance.

In order to resolve such a complex problem, designers often have a set of rules or constraints to ensure that each AP operates correctly and that the mesh as a whole functions properly. For example, the designer might require that each AP must have a maximum of 3 node-to-node hops back to the BAN in order to satisfy a delay threshold. The problem is that correcting for one such basic design constraint might lead to other failures due to the complex relationships between mesh nodes. It is therefore crucial for the designer to envision and manipulate the relationships between changes in individual parameters and the performance of the entire mesh network. Furthermore, the relationship with each of the design constraints and how it affects the entire solution becomes increasingly complex with larger scale deployments. The designer must also consider that mesh networks are deployed across varying geographical areas littered with obstructions such as buildings, terrain, and foliage. Consideration of the location and properties of these obstructions is essential to understanding the performance of a mesh network. Thus, an optimal solution should empower the designer to discern the performance of the network, easily identify problems, and be able to resolve such problem efficiently regardless of the scale of the network and environment in which the network resides.

A solution demonstrating these qualities has not yet been disclosed by prior art. Accordingly there exists a need for a new method and system for analysis and visualization of a wireless communications network.

BRIEF DESCRIPTION OF THE DRAWINGS

The above needs are at least partially met through provision of the method and system for analysis and visualization of a wireless communications network described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a system and method for analysis of a wireless communications network is disclosed. A map of a physical environment integrating communications hardware for implementing a wireless communications network is defined. Client service requirements and regions for the wireless communications network are defined. Mesh point constraints and mesh linkage constraints for the wireless communications network are defined. The communications hardware is placed on the map at initial locations. Whether at least one of the defined mesh point constraints and mesh linkage constraints have been met by at least one mesh link between communications hardware based upon the initial locations of the communications hardware in the communications network is calculated. In one embodiment, the at least one calculation is displayed as a visualization on the defined map.

Figure 1:
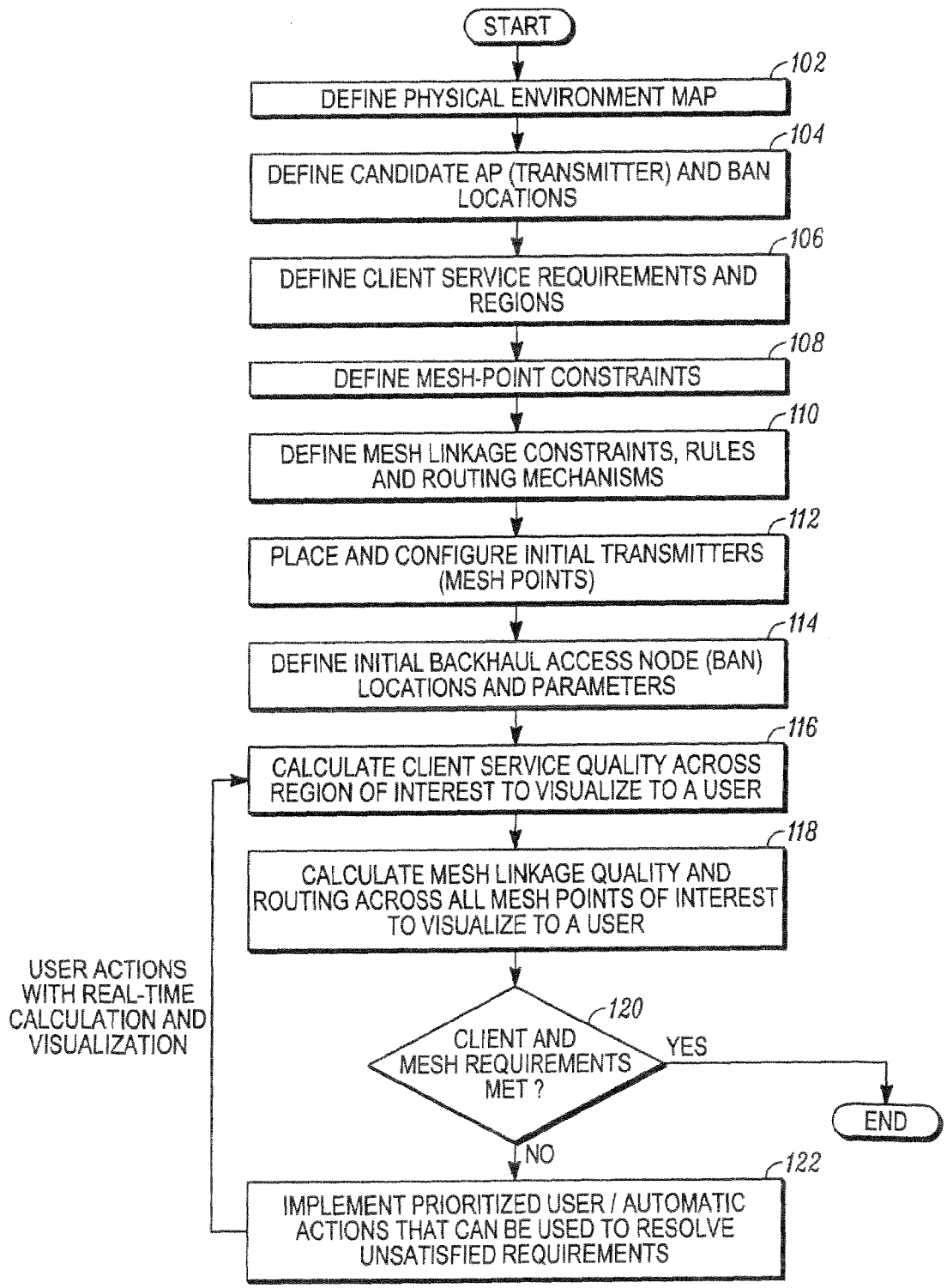
FIG. 1 shows an example method in accordance with an embodiment of the present invention.

These and other benefits may become clearer upon making a thorough review and study of the following detailed description. Referring now to the drawings, and in particular to FIG. 1, a method for analysis and visualization of a wireless communications network is shown.

First, a map of the physical environment must be defined (step 102). In one embodiment, a method for generating a map of the physical environment is disclosed in U.S. Pat. No. 6,850,946 entitled "Method and System for a Building Database Manipulator," which is hereby incorporated by reference and describes a site specific computer model. As described in the patent, the resulting map utilizes a specially formatted raster and/or vector database comprising lines and polygons that represent physical objects within the physical environment. The arrangement of lines and polygons in the database corresponds to physical objects in the environment. For example, a line or other shape in the database could represent a wall, a door, a tree, a building wall, or some other physical object in the physical environment.

From the standpoint of radio wave propagation, each obstruction/partition in a physical environment (i.e., each line or polygon in the drawing) has electromagnetic properties that affect a radio wave. When a radio wave signal intersects a physical surface, it interacts with the electromagnetic properties of the surface. A certain percentage of the radio wave reflects off of the surface and continues along an altered trajectory; a certain percentage of the radio wave penetrates through the surface and continues along its course; a certain percentage of the radio wave is scattered once it strikes the surface, etc. The electromagnetic properties assigned to the obstruction/partition define and model this interaction, and thus define the break down in percentages of the radio wave reacting in a given manner upon intersection. In terms of the physical environment map and the database representing the physical environment, each obstruction/partition has several parameters used to define its electromagnetic properties. For example, the attenuation factor of a partition determines the amount of power lost by a radio signal that penetrates through it; the reflectivity of a partition determines the portion of the radio signal reflected from it; and the surface roughness of a partition determines the portion of the radio signal that is scattered upon intersection.

Once the physical environment map has been defined, the designer identifies and specifies the location and type of all candidate APs (including access points, network routers, network bridges, network hubs, network switches, client devices, and other fixed or mobile transceivers) and, optionally, Backhaul Anchored Nodes (BANs, which are APs with a wired or wireless connection to a separate communications network and/or the Internet), both collectively termed communications hardware, within the physical environment map (step 104). In one embodiment, this step is performed via a point-and-click process by the user selecting desired communications hardware from a computer parts database and then visually positioning, and orienting the selected communications hardware within the physical environment map to form a complete wireless communications system. For example, the communications hardware may be placed in street lamps in the physical environment. Each AP or BAN may consist of one or more individual devices physically connected in a local network, constituting a single node in the broader wireless mesh network. Indeed one skilled in the art may appreciate that each AP, BAN, or other node in the wireless mesh network may itself consist of various hardware devices interconnected by another sub-network or super-network. In one embodiment of the invention, an embodiment of the computer parts database, referred to hereinafter as a parts list library, is more fully described in U.S. Pat. No. 6,493,679 entitled "Method and System for Managing a Real-Time Bill of Materials," which is hereby incorporated by reference.

Further, the additional communications equipment necessary to interconnect and complete the wireless communications system may also be selected via the same process. For example, base station transceivers, cabling, connectors/splitters, amplifiers, antennas, and other RF hardware components are also preferably assembled using either a drag-and-drop or a pick-and-place technique and graphically displayed overlaid with the physical environment map. In one embodiment, the communications hardware and the additional communications equipment are associated with electromechanical information available from the parts list library that fully describes the component in terms of physical operating characteristics (e.g., the noise figure, frequency, radiation characteristics, etc.) which is used to calculate whether client and mesh requirements are met. In any case, the defined communications hardware (step 104) is integrated with the defined map (step 102) to create a site specific computer model of the wireless communications system.

Next, client service requirements and regions are defined (step 106) for the created site specific computer model of the wireless communications system. In one embodiment, such a step is performed by a point-and-click process to designate quality of service requirements necessary for a client of the wireless communications system. For example, the client may specify that the wireless communications system operate according to a certain coverage requirement (e.g. received radio signal power) and/or capacity requirement (e.g. sustained network data throughput). Further, the client may specify a certain delay threshold for the wireless communications network. In any event, the client may specify performance parameters such as a number of users of the wireless communications system, a type of traffic, a received signal strength indication, a signal interference ratio, a signal to noise ratio, throughput, etc. In one embodiment, such a step is additionally performed by a point-and-click process to designate the boundary of a region that encapsulates the area of interest within the created site specific computer model. In one embodiment, the region identified by the point-and-click process is a two-dimensional (2-D) plane or three-dimensional (3-D) surface within the site specific computer model where the site specific computer model is a two- or three dimensional representation of the physical environment. Once the region has been identified, the region may be automatically segmented into a grid of vertices where the grid has a size and spacing.

Next, mesh point constraints are defined (step 108). In one embodiment, such a step is performed by a point-and-click process to designate attributes relating to the communications hardware in the wireless communications system. For example, the wireless communications system may be required to operate with a certain number or a certain range of communications hardware. Such a constraint may be placed to ensure that the wireless communications system be within a certain budget. Other mesh point constraints that may be considered within such a step comprise transmitter, receiver, or transceiver characteristics of the communications hardware, speed of a backhaul connection available at a BAN, and maximum throughput per mesh link. Further mesh constraints comprise locations where the communications hardware can be located, e.g. on street lamps, and locations where the communications hardware can not be located, e.g. inside a concrete reinforced building.

Next, mesh linkage constraints are defined (step 110). In one embodiment, such a step is performed by a point-and-click process to designate constraints, routing rules, and mesh linkage rules necessary for the wireless communications system to operate properly. For example, the client may specify that there only be a specific number of hops between a mobile subscriber and a BAN. Further, the client may specify a number of redundant hops to a BAN. In any event, the client may specify other rules such as end-to-end latency, a method to choose routes given multiple path choices, etc.

In any case, once the requirements from steps 102-110 are defined, initial placement of APs (step 112) and initial placement of BANs (step 114) occurs automatically with respect to the defined locations from step 104. In one embodiment, steps 112 and 114 are performed by a software algorithm for network design, which automatically selects preferred AP and BAN sites. In an alternative embodiment, the initial placement of APs (step 112) and of BANs (step 114) is simply performed by automatically placing APs at all available AP locations, and BANs at all available BAN locations. In yet another alternative embodiment, the initial placement of APs and BANs reflects the actual placements of nodes in a mesh network which has already been deployed using other methods, and which is being analyzed for improvement.

Next, calculations relating to client constraints, mesh linkage constraints, client service requirements, and mesh linkage are performed (steps 116-118). At step 116, calculations relating to client service quality across the selected region are performed so that a visualization of the calculated service quality may be displayed to a user. At step 118, calculations relating to mesh linkage quality and routing across all mesh points of interest are performed so that a visualization of the calculated mesh linkage quality and routing may be displayed to a user. In on embodiment, the visualization may be a color-coded lines or line thickness. For example, a red link could indicate a 2 Mbps mesh link and a green link could indicate a 54 Mbps mesh link. Similarly, a line of smaller thickness could indicate a mesh link that is performing at 2 Mbps and a much thicker line can indicate a link performance of 54 Mbps. The color code/line thickness can be based on any metric and might not necessarily be throughput. In any case, by displaying the visualization of the calculations, a user may easily determine that requirements from steps 102-110 are not met.

As can be understood, designing the wireless communications system to take into account the requirements from steps 102-110 is a difficult task. In one embodiment, the calculations performed (steps 116, 118) are facilitated by using graph theory and/or computationally efficient geometrical algorithms to provide real-time calculation and visualization of the wireless communications.

In such an embodiment, a fast graph theory algorithm that searches for connectivity based on simulated signal distribution on the physical map is used. The fast graph theory algorithm searches for a shortest path (also termed smallest number of hops) between the communications hardware, e.g. APs and BANs. In the graph, the mesh nodes are represented by graph vertices and the mesh links graph edges. From each BAN mesh node, there is a tree-of-shortest-path search with a BAN as the source (root). In one embodiment, a Dijkastra method is used for tree search as is well known in the art, e.g. see *Network Flow*, by R. K. Ahuja, T. L. Magnanti, and J. B. Orlin, 1993, Prentice-Hall. By using a data structure for graph vertices and edges, the fast graph theory algorithm can check the mesh linkage constraints quickly. Thus, mesh links that exceed a limit and isolated communications hardware may be easily identified.

In another embodiment, using a data structure where mesh nodes are represented as graph vertices, each mesh node is able to remember a set of its ancestors and remembers the number of hops from the BAN. When a limit is reached, a flag is raised for the violation. A flag is also raised if the mesh node is a BAN itself so that the mesh node can be marked and counted for BAN connectivity calculation. Each mesh node also remembers a list of edges that link to the neighbor mesh nodes. In the edge (link) structure, the end mesh nodes are remembered along with the indices of edge lists that are associated with the two mesh nodes. A flag will be raised if the edge is defined as blocked link. If a mesh node's root set is empty, the mesh node is isolated. In the process of adding a link between mesh nodes, a flag can be raised if the maximum connectivity of a mesh node with its neighbors is greater than a maximum number.

In any case, returning to FIG. 1, if client and mesh requirements are not met (step 120), then an embodiment of the present invention implements prioritized user/automatic actions that can be used to resolve unsatisfied requirements. In one embodiment, implementing prioritized user/automatic actions means that communications hardware may be moved, reoriented, or reconfigured either automatically or manually in the physical environment so as to meet client and mesh requirements. In another embodiment, implementing prioritized user/automatic actions means that a routing protocol of the communications hardware is changed so that varying the routing protocol allows the designer to meet at least one of mesh point constraints and mesh linkage constraints. In any case, once unsatisfied design requirements are identified (e.g. when mesh point constraints and/or mesh linkage constraints are not met), the invention implements prioritized user/automatic actions that include but are not limited to adding APs, moving APs, promoting APs into a BAN set, demoting APs from a BAN set, or changing different RF characteristics of the AP. Each of these methods will give a designer of the wireless communications system the flexibility to meet client and/or mesh performance requirements.

Continuing, once the calculation is made and constraints that have not been met are identified, the result of the calculation is displayed as visualization on the map. As mentioned above, in on embodiment, the visualization may be a color-coded lines or line thickness. Even though the term visualization is singular (as used herein), visualization refers to at least one, but may definitely encompass more than one and is plural. In another embodiment, the visualization may encompass icons and other indicators, such as a ring may be used as the visualization.

In one embodiment, the designer is able to filter the problem mesh nodes by only displaying the mesh nodes that are causing a particular constraint or set of constraints (as used below, also termed rules) to be broken. Having such an ability allows the user to see how each problem or set of problems independently affects the entire network. This allows the designer to meet defined constraints when the constraints are filtered.

For example, if there are too many links to one mesh node (a situation in which the mesh node in question is referred to as an over-connected node), the mesh node will be visualized with the appropriate graphical icon. If such situation happens, the user can pre-define a blocked pair of mesh nodes to prevent any link between the pairs of mesh nodes from happening. For example, if a mesh node has no linkages that can form with other mesh nodes, such a node is referred to as an isolated node and will be visualized with the appropriate graphical icon. As another example, if each mesh node is not connected to a minimum number of independent BAN nodes (a situation in which the mesh node in question is referred to as an unreliably connected node), then the user may promote any existing mesh node as a BAN, which identifies the mesh node as having a backhaul connection available, to see if the problem can be eliminated.

In one embodiment, before a designer determines to promote an AP, the designer may use the mouse cursor hovering over any potential candidate in a promoting mode and cause a calculation to occur to determine whether the promotion will assist with the design of the wireless communications system. This provides guidance to a designer as to what changes or potential changes to the mesh network may be beneficial prior to implementing the changes. After the re-calculation, some of the mesh nodes that were marked as being unreliably connected nodes may be eliminated from the violator list. In one embodiment, if the designer is satisfied with the results, the designer may accept the new design and the AP will be promoted permanently. If the designer is not satisfied, the user may move the mouse cursor over to another AP to see a different effect, until a good BAN candidate is found.

Figure 2:
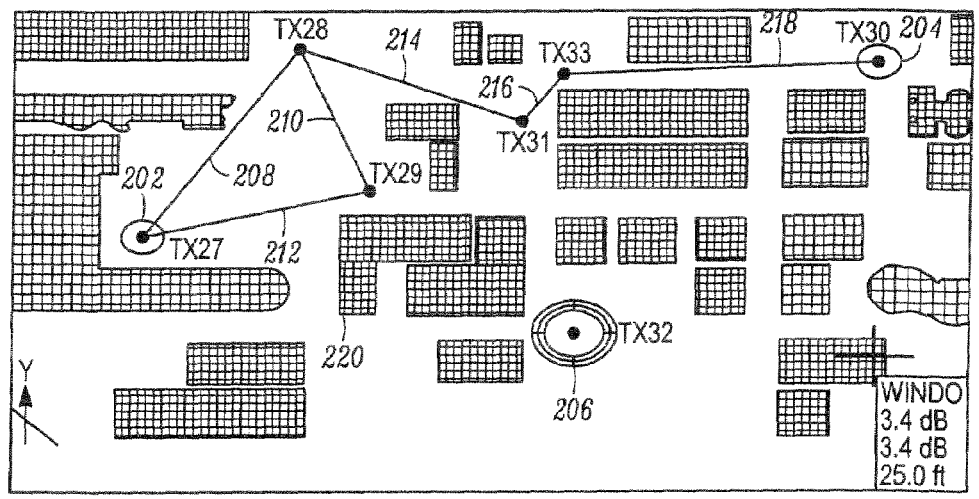
FIG. 2 shows an example system exemplifying the operation of an embodiment of the present invention.

Referring now to FIG. 2, there is shown a two-dimensional (2-D) simplified layout of a building floor plan. The method uses a two- or three-dimensional (3-D) computer aided design (CAD) representation of a building, a collection of buildings, and/or the surrounding terrain and foliage to provide analysis and visualization of the wireless communications network. In one embodiment of the present invention, a network designer can visualize, in real-time, how rules are preserved or broken on the physical map. As a new mesh node is either added or moved by dynamically placing and moving the mouse cursor around within the map can cause re-calculation of rules to occur in order to take into account the updated number, position, and/or configuration of mesh nodes in the network at that time. For example, the mesh links may emerge or disappear, the colors of the links may change indicating the capacity or overall desirability of the link, the markers for BAN nodes and markers for "Isolated" mesh nodes and/or "Over-Connected" mesh nodes may emerge and disappear. In short, the physical map gives the designer a global perspective of the wireless communications network while making local modifications to a certain portion of the wireless communications network.

As an example, FIG. 2 implements the following rules (also termed constraints, as used above):

Rule 1: Based on capacity requirements there shall be a lowest RSSI, SIR, SNR, and throughput values for each link. Any values below the limits invalidate the link. All the isolated mesh nodes should be marked to warn the designer.

Rule 2: To control packet delay and other network quality issues, the number of hops that each packet can traverse in a path through the network should be limited by a defined maximum. Based on available links and the limit on the hops, any mesh node beyond the hop limit to a BAN will be considered to not have a path to that BAN. Connectivity to a BAN, as defined as the number of paths to different BAN mesh nodes, shall be calculated as the mesh changes. Although a BAN mesh node is indicated by the above as the desired destination for a packet in this example, the desired destination analyzed by the present invention could be another client device or communications hardware device connected to or part of the mesh network.

Rule 3: To increase the network reliability, each mesh node must connect to a minimum number of independent BAN nodes. Any mesh node with BAN connectivity below the limit shall be marked as insufficiently reliable mesh node.

Rule 4: Based on how much throughput of an AP can handle and how much bandwidth each link requires, the maximum connectivity of a mesh node with its neighbors shall be defined. Any mesh node with more links than it can handle shall be marked as over-connected mesh node. To solve this problem, some of the potential mesh links should be defined as blocked.

Rule 5: Based on clutter/obstruction properties, channel availability for the air interface standards used by the mesh link and client link respectively, and predictive RSSI simulations for client coverage, the client should experience strong signals, smooth hand-over, and a high quality network connection as the client moves. In other words, the coverage of all APs must have minimum holes, sufficient overlapping to guaranty smooth hand-over and minimum interference with each other. The client coverage map shall show the coverage areas with color codes to indicate the quality.

Rule 6: When unreachable regions or available points are defined, the AP placement exercises shall observe the restriction rules and only allow the AP placed in the reachable areas/spots.

Rule 7: There can be a metric for each mesh node describing the packet delay attributed to that mesh node. If the cumulative end-to-end packet delay from a mesh node to a BAN exceeds a certain threshold then this rule can be in violation Rule 8: There can be a maximum number of blocked links. If a mesh node exceeds the maximum number of blocked links then the rule is in violation Referring back to FIG. 2, shown is a wireless mesh network with communications hardware, namely 2 BAN mesh nodes 202, 204 and an isolated AP mesh node 206. In one embodiment, the AP mesh node 206 is surrounded by a blue ring to indicate that there is a violation. Further, the mesh links 208-218 are also color coded to indicate throughput. For example, a red line may indicate low throughput and a green line may indicate a high throughput. The grid polygons, e.g. 220, are clutter objects that obstruct RF propagation. The obstructions may also be unreachable regions for communications hardware placement. As shown in FIG. 2, AP mesh node 206 is isolated and a new AP should be added to allow the AP mesh node 206 to connect to the rest of the wireless mesh network.

Figure 3:
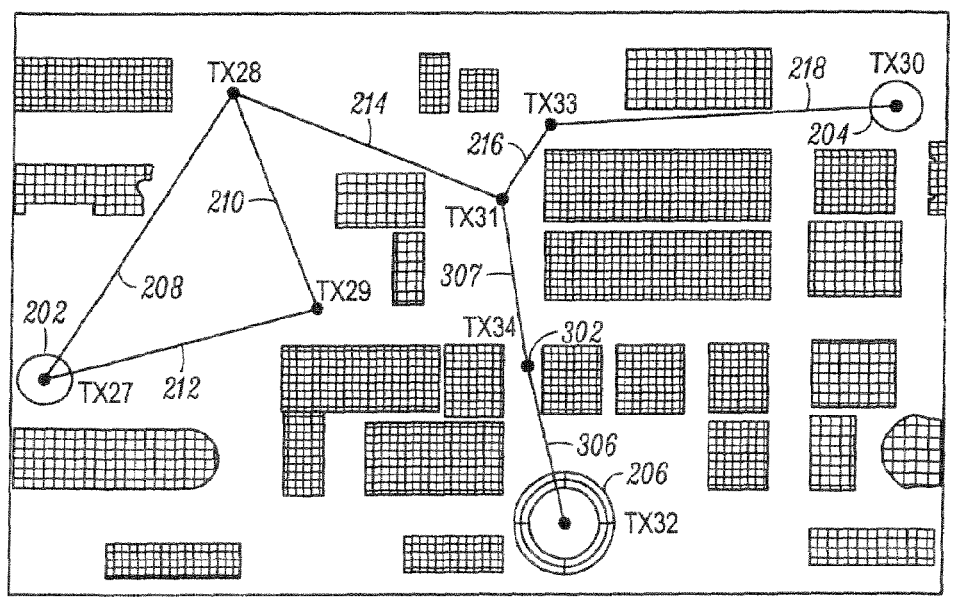
FIG. 3 shows an example system exemplifying the operation of an embodiment of the present invention.

Referring to FIG. 3, shown is AP 302 that is placed in the wireless mesh network so that AP 206 may connect to the rest of the wireless mesh network via links 304, 306. AP 206 still has a ring around it because the rules require that there be a maximum of three hops to get back to a BAN. As shown in FIG. 3, AP 206 requires at least four hops to reach a BAN, e.g. BAN 202, 204. Thus, there is still a violation of the rules with the design in FIG. 3.

Figure 4:
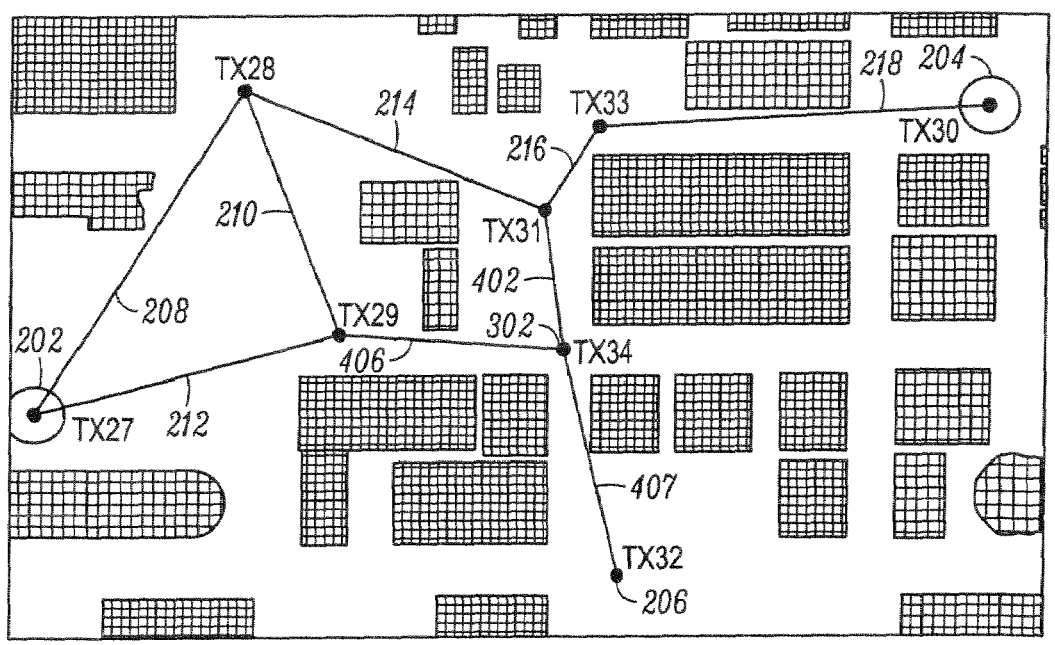
FIG. 4 shows an example system exemplifying the operation of an embodiment of the present invention.

Referring to FIG. 4, shown is a new placement for AP 302 so that there is no violation of the rules and as a result the ring around AP 206 disappears. Specifically, AP 206 is provided a connection to a BAN node within three hops, namely mesh links 404, 406, 212.

While the given examples are indicative of one embodiment of the invention that utilizes manual interaction by the user as a means of diagnosing and resolving mesh network issues, other embodiments of the present invention may utilize automated analysis capabilities to iteratively consider multiple possible solutions for a problem. For example, one embodiment of the present invention may iteratively consider placing new APs, promoting existing APs to have backhaul connectivity, and moving or reconfiguring existing APs in order to minimize the number of rules being violated by the resulting mesh network.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for analysis of a wireless mesh network comprising:
   defining a map of a physical environment integrating communications hardware for implementing the wireless mesh network, wherein the communication hardware comprises at least one backhaul anchored node (BAN) and a plurality of mesh nodes;
   defining client service requirements and regions for the wireless mesh network;
   defining mesh point constraints and mesh linkage constraints for the wireless mesh network, wherein the mesh linkage constraints comprises at least one constraint between the at least one BAN and each of the plurality of mesh nodes;
   placing the at least one BAN and each of the plurality of mesh nodes on the map at initial locations;
   calculating whether at least one of the defined mesh point constraints and mesh linkage constraints have been met by at least one link between the at least one BAN and each of the plurality of mesh nodes based upon the initial locations of the at least one BAN and each of the plurality of mesh nodes; and
   interconverting between at least one of the plurality of mesh nodes and at least one BAN to meet the defined mesh point and mesh linkage constraints, based on the calculation that the at least one of the defined mesh point constraints and mesh linkage constraints is not met, wherein the at least one BAN connects the wireless mesh network to a data network.

2. The method of claim 1 further comprising the step of displaying at least one calculation as a visualization on the defined map.

3. The method of claim 2 wherein the step of displaying is performed by filtering at least one of mesh point constraints and mesh linkage constraints to indicate only a particular constraint or a set of constraints of interest.

4. The method of claim 2 wherein the step of displaying is performed quickly after the step of calculating so that a user of the method is unaware of the calculating step.

5. The method of claim 1 wherein the step of calculating is performed using a graph theory algorithm wherein mesh nodes are represented as graph vertices and mesh links are represented as graph edges.

6. The method of claim 1 further comprising implementing prioritized user actions, if the defined mesh point constraints and mesh linkage constraints have not been met.

7. The method of claim 6 wherein the prioritized user actions comprise adding communications hardware, moving communications hardware, promoting communications hardware, demoting communications hardware, and changing RF characteristics of the communications hardware.

8. The method of claim 1 further comprising implementing automatic actions, if the defined mesh point constraints and mesh linkage constraints have not been met.

9. The method of claim 1 wherein the visualization comprises at least one of color code, line thickness, and a graphical icon.

10. The method of claim 1 wherein the map is a site specific computer model of the wireless communications network.

11. The method of claim 1 wherein the steps of defining are performed by using at least one of a drag-and-drop technique and a pick-and-place technique.

12. The method of claim 1 further comprising moving the communications hardware on the map to subsequent locations and recalculating whether the defined mesh point constraints and mesh linkage constraints have been met based upon the subsequent locations.

13. The method of claim 1 wherein the mesh linkage constraints comprises at least one of a number of hops to a backhaul anchored node, a number of redundant paths to a backhaul anchored node, end-to-end latency, and choice of routes given multiple path choices.

14. The method of claim 13 wherein the step of calculating is performed by at least one of a graph theory algorithm and a geometrical algorithm.

15. A method for analysis of a wireless mesh network comprising:
   defining a map of a physical environment integrating at least one access point and a backhaul anchored node (BAN) for implementing the wireless mesh network;
   defining client service requirements and regions for the wireless mesh network;
   defining at least one of mesh point constraints and mesh linkage constraints for the wireless mesh network, wherein the mesh linkage constraints comprises at least one constraint between the BAN and the at least one access point;
   placing the BAN and the at least one access point on the map at initial locations;
   calculating whether the at least one of the defined mesh point constraints and mesh linkage constraints has been met based upon the initial locations of the BAN and the at least one access point;
   displaying at least one calculation as a visualization on the defined map; and
   interconverting between the at least one access point and the BAN to meet the defined mesh point and mesh linkage constraints, based on the calculation that the at least one of the defined mesh point constraints and mesh linkage constraints is not met, wherein the BAN connects the wireless mesh network to a data network.

16. The method of claim 15 wherein the step of calculating is performed using a graph theory algorithm wherein the BAN is represented as a graph vertex and a wireless link between the BAN and another at least one communication hardware node is represented as a graph edge.

17. The method of claim 16 further comprising implementing automatic actions, if the at least one of the defined mesh point constraints and mesh linkage constraints has not been met.

18. The method of claim 15 wherein the mesh point constraints comprise at least one of a range of communications hardware, transmitter, receiver, or transceiver characteristics of the communications hardware, speed of a backhaul connection available at a backhaul anchored node, a maximum throughput per mesh link, a location where the at least one access point and backhaul anchored node can be located, and a location where the at least one access point and backhaul anchored node can not be located.

19. The method of claim 15 wherein the mesh linkage constraints comprise at least one of a number of hops, a number of redundant hops to a backhaul anchored node, end-to-end latency, and a choice of given multiple path choices.

20. A system for analysis of a wireless mesh network comprising:
   means for defining a map of a physical environment integrating communications hardware for implementing the wireless mesh network, wherein the communication hardware comprises at least one backhaul anchored node (BAN) and a plurality of mesh nodes;

means for defining client service requirements and regions for the wireless mesh network;

means for defining mesh point constraints and mesh linkage constraints for the wireless mesh network, wherein the mesh linkage constraints comprises at least one constraint between the at least one BAN and each of the plurality of mesh nodes;

means for placing the at least one BAN and each of the plurality of mesh nodes on the map at initial locations; and means for calculating whether at least one of the defined mesh point constraints and mesh linkage constraints have been met by at least one link between the at least one BAN and each of the plurality of mesh nodes based upon the initial locations the at least one BAN and each of the plurality of mesh nodes; and means for interconverting between at least one of the plurality of mesh nodes and the at least one BAN to meet the defined mesh point and mesh linkage constraints, based on the calculation that the at least one of the defined mesh point constraints and mesh linkage constraints is not met, wherein at least one BAN connects the wireless mesh network to a data network.

* * * * *